United States Patent
Araki et al.

(10) Patent No.: US 6,743,741 B1
(45) Date of Patent: Jun. 1, 2004

(54) PROCESS FOR PRODUCING ADHESIVE FOR FUSION BONDING, ADHESIVE FOR FUSION BONDING OBTAINED BY THE PROCESS, AND ADHESIVE FABRIC CONTAINING THE ADHESIVE FOR FUSION BONDING

(75) Inventors: Eiichi Araki, Himeji (JP); Norihiro Sugihara, Himeji (JP); Kaichiro Nakao, Himeji (JP); Hiroshi Manabe, Himeji (JP); Tooru Takei, Sanda (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 168 days.

(21) Appl. No.: 10/030,845

(22) PCT Filed: Jul. 10, 2000

(86) PCT No.: PCT/JP00/04613

§ 371 (c)(1),
(2), (4) Date: Jan. 11, 2002

(87) PCT Pub. No.: WO01/04230

PCT Pub. Date: Jan. 18, 2001

(30) Foreign Application Priority Data

Jul. 12, 1999 (JP) .......................................... 11-196969

(51) Int. Cl.[7] .............................................. D03D 15/00

(52) U.S. Cl. ...................... 442/187; 428/355; 442/190; 524/425

(58) Field of Search ........................ 524/425; 428/355; 442/187, 190

(56) References Cited

FOREIGN PATENT DOCUMENTS

| | | |
|---|---|---|
| EP | 328301 | 8/1989 |
| JP | 61-119778 | 6/1986 |
| JP | 6-145413 | 5/1994 |
| JP | 7-8772 | 1/1995 |
| JP | 8-117578 | 5/1996 |
| JP | 10-231402 | 9/1998 |
| JP | 10-231464 | 9/1998 |
| JP | 11-80602 | 3/1999 |
| WO | 92/15634 | 9/1992 |

*Primary Examiner*—Terressa M. Boykin
(74) *Attorney, Agent, or Firm*—Merchant & Gould P.C.

(57) ABSTRACT

A heat-fusion bonding adhesive is prepared by heating a thermoplastic resin to a temperature of no less than the softening temperature of the resin and then dispersing the resin in the softened state in an aqueous medium. Dispersing the thermoplastic resin in the aqueous medium is conducted, for example, by applying a shear force to the aqueous medium by stirring. In this case, stirring of the aqueous medium is preferably conducted till the thermoplastic resin is divided into particles with a weight-average particle size of 0.1–20 $\mu$m.

12 Claims, No Drawings

PROCESS FOR PRODUCING ADHESIVE FOR FUSION BONDING, ADHESIVE FOR FUSION BONDING OBTAINED BY THE PROCESS, AND ADHESIVE FABRIC CONTAINING THE ADHESIVE FOR FUSION BONDING

TECHNICAL FIELD

The present invention relaters to a method for the manufacture of a heat-fusion bonding adhesive. Further, the present invention also relates to a heat-fusion bonding adhesive obtained by this method. Moreover, the present invention also relates to a heat-fusion bonding adhesive obtained by thermally fusing the heat-fusion bonding adhesive to the surface of a base fabric.

BACKGROUND ART

Base materials of various types have been provided with a variety of functional properties such as oil resistance, solvent resistance, chemical resistance, wear resistance, gas shielding ability, adhesive properties, and the like by coating a thermoplastic resin thereon and forming a coating film. Among them, adhesive fabrics obtained by using a fiber-containing cloth or nonwoven fabric as a base fabric and coating a thermoplastic resin on the surface of the base fabric have been used mainly as adhesive interlinings in the field of clothing.

For example, Japanese Patent Application Laid-open No. H6-145413 disclosed an adhesive interlining fabricated by the following method. First, a composition prepared by adding silica and a silane coupling agent to an acrylic polymer emulsion such as acrylate resin was coated on a fiber-containing nonwoven fabric serving as a base fabric and dried. Then, a powder of a thermoplastic resin such as a polyamide resin, polyester resin, polyethylene resin, ethylene-vinyl acetate resin, polyvinyl chloride resin, and the like was scattered over the coating and melted to obtain an adhesive interlining.

A variety of methods such as a scattering method, powder dot method, spray method, paste dot method, double dot method, and the like are employed for heating and fusing the thermoplastic resin powder to the base fabric surface, and the appropriate method is selected according to the type of base fabric. With the scattering method, a thermoplastic resin powder is uniformly scattered over the base fabric surface, heated, and fused. With the powder dot method, a thermoplastic resin powder is first caused to adhere to a gravure roll, then transferred to the base fabric surface, heated, and fused. With the spray method, a paste prepared by dispersing a thermoplastic resin powder in water is sprayed as-is on the base fabric surface, thermally dried, and fused. With the paste dot method, a paste prepared by dispersing a thermoplastic resin powder in water is dot-like coated on the base fabric surface by using a coating screen having fine holes, thermally dried, and fused. The double dot method comprises the steps of dot-like coating an acrylic emulsion on the base fabric surface by using a coating screen having fine holes, scattering a thermoplastic resin powder over the obtained dot-like coating, removing the excess thermoplastic resin powder, and thermally drying and fusing the thermoplastic resin powder remaining on the base fabric. The thermoplastic resin powder thermally fused to the base fabric surface by those methods is used as a heat-fusion bonding adhesive and thermally fuses the base fabric to a surface fabric when reheated during usage.

Adhesive fabrics, in particular, adhesive interlinings mainly serve to supplement the properties of the surface fabrics in order to give a final three-dimensional touch to a dress, to facilitate sewing and also to provide shape stability so as to prevent loss of shape in wearing or washing and dry cleaning. They are usually used for collars, cuffs, lapels of men's business suits, women's suits and the like and the required properties thereof differ depending on the application and place where they are used. For this reason, the optimum adhesive interlining is selected upon consideration of various conditions such as the type of thermoplastic resin powder, heat sealing method, type of base fabric, and the like.

The thermoplastic resin powder can be prepared by a mechanical grinding method by which a thermoplastic resin such as a copolyamide resin, copolyester resin, ethylene-vinyl acetate copolymer resin, polyethylene resin, polyurethane resin, and the like is mechanically ground at normal temperature, or by a freeze grinding method by which grinding is conducted under freezing.

In recent years, in addition to the above-mentioned application to women's suits, thin cloths for women have been actively developed and a need has increased for adhesive interlinings which do not degrade aesthetic shaping ability that provides feel and draping ability necessary to obtain beautiful silhouette and aesthetic functions especially required for clothing. However, when a thermoplastic resin powder is used as a hot-sealable adhesive, the resin powder is required to have a weight-average particle size of no more than 20 $\mu$m if an adhesive interlining with a satisfactory feel is to be obtained. However, such a fine resin powder is very difficult to manufacture by the mechanical grinding method or freeze grinding method.

Adhesive interlining prepared by thermally fusing a thermoplastic resin powder with relatively coarse particles having a size within a range of 60–500 $\mu$m to the surface of a base fabric, for example, by a scattering method is typically used in clothing such as women's suits. However, if such an adhesive interlining is used for thin cloths, in particular, thin cloths for women, satisfactory feel is difficult to obtain. Thus, the cloths become rigid to the touch and problems are associated with their draping ability.

Furthermore, in the powder dot method, in order to improve powder separation when the powder is transferred from the gravure roll onto the base fabric, the base fabric has to be preheated to a temperature of 180–250° C. Certain basic fabrics are shrunk by such preheating and the feel thereof is degraded.

On the other hand, the paste dot method uses a paste of a resin powder with a comparatively small particle size within a range of 5–80 $\mu$m, which somewhat improves the feel. However, though the particle size range is referred to as a 5–80 $\mu$m range, the peak of particle size distribution within the range is actually shifted to a large size. As a result, the weight-average particle size is usually about 30–50 $\mu$m, easily causing clogging of fine openings in the coating screen. For this reason, it is difficult to employ the screens with fine holes having a diameter of no more than 200 $\mu$m. As a result, dot spacing is increased which results in a decreased adhesive force and degraded feel.

Furthermore, paste-like adhesives used in the spray or paste dot method are manufactured by dispersing a thermoplastic resin powder in water. As a result, it is difficult to increase the resin concentration to more than 40 wt %. Therefore, drying is time consuming and productivity is poor.

The double dot method resolves the above-described problems. With this method, a resin powder is scattered over an acrylic resin coating obtained by dot-like coating and the resin powder which adhered only to the zones coated with the acrylic resin is used as a hot-sealable adhesive. If the excess powdered resin is removed by suction after scattering, the resin powder should remain only on the acrylic resin dots. However, in reality, the powder cannot be completely removed by suction and the powder remaining outside the dots degrades the feel. Another problem is that the resin powder that adhered to the acrylic resin can peel therefrom, decreasing the adhesive strength.

DISCLOSURE OF THE INVENTION

It is an object of the present invention to provide a method for manufacturing a heat-fusion bonding adhesive suitable for obtaining adhesive interlinings which do not degrade the feel of the clothing, maintain shape stability, and demonstrate sufficient draping ability even when the adhesive is used for thin cloths, in particular, thin cloths for women.

Another object of the present invention is to provide a heat-fusion bonding adhesive obtained by such manufacturing method.

Still another object of the present invention is to provide an adhesive fabric obtained by heating and fusing such heat-fusion bonding adhesive to the surface of a base fabric.

In accordance with the first aspect of the present invention, a method is provided for manufacturing a heat-fusion bonding adhesive for thermally fusing a base fabric to a surface fabric, comprising the steps of heating a thermoplastic resin to a temperature of no less than the softening point of the resin and dispersing it in the softened state in an aqueous medium.

In accordance with the second aspect of the present invention, it provides a heat-fusion bonding adhesive consisting of the aqueous dispersion of a thermoplastic resin obtained by the above-described manufacturing method.

No specific limitation is placed on the thermoplastic resin used in accordance with the present invention. Examples of suitable resins include copolyamide resins, copolyester resins, ethylene-vinyl acetate copolymer resins, polyethylene resins, polyurethane resins, and the like. Those resins may be used individually or in a mixture thereof. When a thermoplastic resin is used in a heat-fusion bonding adhesive for the fabrication of an adhesive fabric, it is preferred that copolyamide resins, copolyester resins, and mixtures thereof be used because of their capability to maintain a good thin cloth feel and resistance to dry cleaning and washing.

No specific limitation is placed on copolyamide resins. Suitable examples include copolyamide resins comprising structural units of at least two types selected from the group consisting of —[NH(CH$_2$)$_5$CO]—, —[NH(CH$_2$)$_6$NHCO(CH$_2$)$_4$CO]—, —[NH(CH$_2$)$_6$NHCO(CH$_2$)$_8$CO]—, —[NH(CH$_2$)$_{10}$CO]—, and —[NH(CH$_2$)$_{11}$CO]—. Specific examples include 6/66 copolymer nylon, 6/610 copolymer nylon, 6/11 copolymer nylon, 6/12 copolymer nylon, 6/66/610 copolymer nylon, 6/66/11 copolymer nylon, 6/66/12 copolymer nylon, 6/66/11/12 copolymer nylon, 6/66/610/11/12 copolymer nylon, and polyamide elastomers which are the copolymers of those copolymer nylons and polyesters or polyalkylene ether glycols. Among them, 6/66/11 copolymer nylon, 6/66/12 copolymer nylon, and 6/66/11/12 copolymer nylon are preferred, and 6/66/12 copolymer nylon is especially preferred.

No specific limitation is placed on the copolyester resins. Examples of suitable copolyester resins include copolyester resins obtained by polycondensation of (A) an acid component comprising terephthalic acid and isophthalic acid and (B) a diol component such as ethylene glycol, diethylene glycol, polyethylene glycol, 1,4-butane diol or 1,6-hexane diol. Specific examples include terephthalic acid/isophthalic acid/1,4-butane diol copolyester resin, terephthalic acid/isophthalic acid/1,6-hexane diol copolyester resin, terephthalic acid/isophthalic acid/polyethylene glycol copolyester resin, terephthalic acid/isophthalic acid/ethylene glycol/1,4-butane diol copolyester resin, terephthalic acid/isophthalic acid/adipic acid/1,4-butane diol copolyester resin, and terephthalic acid/isophthalic acid/1,4-butane diol/diethylene glycol copolyester resin. Among them, terephthalic acid/isophthalic acid/1,4-butane diol copolyester resin, terephthalic acid/isophthalic acid/ethylene glycol/1,4-butane diol copolyester resin, and terephthalic acid/isophthalic acid/1,4-butane diol/diethylene glycol copolyester resin are preferred, and terephthalic acid/isophthalic acid/1,4-butane diol copolyester resin is especially preferred.

In the manufacturing method in accordance with the present invention, the thermoplastic resin can be dispersed in an aqueous medium by heating the thermoplastic resin to a temperature of no less than the softening point thereof to obtain a softened state and then applying a shear force to the aqueous medium. In this process, the thermoplastic resin preheated to a temperature of no less than the softening point thereof may be added to the similarly heated aqueous medium under stirring, or the thermoplastic resin may be added to the aqueous medium under stirring and then heated together with the aqueous medium to a temperature of no less than the softening point thereof. Furthermore, when the thermoplastic resin is an ethylene-vinyl acetate copolymer resin, a polyethylene resin which is not terminated with a functional group, and the like, a surfactant or a dispersing agent may be added, if necessary, to the aqueous medium to accelerate the dispersion process. Furthermore, when the thermoplastic resin is a copolyamide resin or copolyester resins terminated with a carboxyl group, a basic substance may be added to the aqueous medium in addition to or instead of the surfactant or dispersing agent.

Examples of the surfactants include anionic surfactants (for example, rosin acid salts, fatty acid salts, alkylbenzenesulfonates), cationic surfactants (for example, dodecyltrimethylammonium chloride), nonionic surfactants (for example, ethylene oxide-propylene oxide block copolymer, polyoxyethylene alkyl ethers, glycerin fatty acid esters, polyoxyethylene fatty acid ethanolamides), amphoteric surfactants (for example, N-alkyl-N,N-dimethylammonium betaine).

Examples of dispersing agents include polymer dispersing agents such as polyacrylic acid salts, polystyrenesulfonic acid salts, polystyrene maleic anhydride salts, polyvinyl alcohol, hydroxyethyl cellulose, and the like, and inorganic dispersing agents such as alumina sol, silica sol, calcium phosphate, and the like.

Examples of basic substances include alkali metal hydroxides, such as sodium hydroxide or potassium hydroxide, ammonia, and amines. From the standpoint of dispersing effect, alkali metal hydroxides such as sodium hydroxide or potassium hydroxide are preferred.

In the manufacturing method in accordance with the present invention, good results are obtained if dispersing of the thermoplastic resin in the aqueous medium is conducted at a temperature of no less than the softening point thereof, usually, at 50–300° C., preferably, 70–220° C. When the temperature is less than 50° C., softening of the thermoplastic resin in the aqueous medium is insufficient and, therefore, homogeneous dispersion cannot be obtained. When the temperature is higher than 300° C., the thermoplastic resin is degraded which is undesirable.

Furthermore, the amount of the aqueous medium used in the manufacturing method in accordance with the present invention is usually 30–1500 weight parts, preferably, 100–500 weight parts per 100 weight parts of thermoplastic resin. If the amount of water used is less than 30 weight parts, the thermoplastic resin cannot be completely dispersed in water, and if the amount is above 1500 weight parts, the concentration of the obtained aqueous dispersion thermoplastic resin is low which is undesirable for usage.

In the manufacturing method in accordance with the present invention, the weight-average particle size of resin particles in the aqueous dispersion of thermoplastic resin can be randomly adjusted, for example, by controlling heating or stirring conditions. It is usually adjusted to 0.1–20 $\mu$m, preferably, 0.1–10 $\mu$m. If the weight-average particle size of resin particles in the aqueous dispersion of thermoplastic resin is less than 0.1 $\mu$m, the particles cohere and gelling easily occurs. As a result, a high resin concentration is difficult to obtain. If the weight-average particle size of resin particles in the aqueous dispersion of thermoplastic resin is more than 20 $\mu$m, fine holes in the screen used for coating are easily clogged and the adhesive force of the base fabric is decreased or the feel is degraded which is undesirable.

The heat-fusion bonding adhesive in accordance with the present invention is usually used upon compounding a viscosity-adjusting agent and adjusting the viscosity to 5000–50,000 mPa·sec. If the viscosity is less than 5000 mPa·sec, the amount infiltrated into the base fabric becomes too high, the fabric feels rigid, and the formation of dots is insufficient. If the viscosity is higher than 50,000 mPa·sec, coating on the base fabric becomes difficult.

The compounded amount of the viscosity-adjusting agent is usually 0.01–5 weight parts based on 100 weight parts of the aqueous dispersion of thermoplastic resin, so as to obtain the above-described viscosity range. Examples of viscosity-adjusting agents include natural or synthetic polymeric thickening agents such as polyacrylamides, sodium polyacrylate, carboxymethyl cellulose, carboxyethyl cellulose, hydroxyethyl cellulose, polyacrylic acid esters, polyethylene oxide, and ethylene oxide-propylene oxide random copolymer. If necessary, a plasticizer, a dispersing enhancer, an antifoaming agent, a softening agent, a stabilizer, and the like may be also compounded.

Furthermore, the concentration of the obtained aqueous dispersion of thermoplastic resin may be randomly adjusted by using an appropriate concentration means, for example, by using a semipermeable membrane. Alternatively, the aqueous dispersion of thermoplastic resin can be used after finely powdering it with drying means, for example, by conducting spray drying of the aqueous dispersion of thermoplastic resin (with or without concentration) as is or upon solid-liquid separation by a centrifugal separation process or by filtration.

In accordance with the third aspect of the present invention, it provides an adhesive fabric obtained by coating the hot-sealable adhesive on the surface of a base fabric and thermally fusing. The adhesive fabric thus obtained can be advantageously used, in particular, as an adhesive interlining which does not degrade the feel of thin cloth.

No specific limitation is placed on the base fabric used as the adhesive fabric in accordance with the present invention. Thus, cloths or nonwoven fabrics using various fiber materials can be used. Examples of fiber materials include natural fibers such as cotton, hemp, silk, wool, and the like, regenerated fibers such as rayon, cupra, and the like, semisynthetic fibers such as acetate, triacetate, and the like, and synthetic fibers such as polyesters, nylon, acryl, urethane, polypropylene, polyethylene, polyvinyl chloride, and the like. Examples of woven fabrics include fabrics or cloths produced from the fiber materials, and examples of nonwoven fabrics include webs in which fiber materials are interwoven by chemical methods, mechanical methods, or combinations thereof.

No specific limitation is placed on the method for coating the heat-fusion bonding adhesive on the base fabric. However, since the heat-fusion bonding adhesive in accordance with the present invention is obtained as an aqueous dispersion, the especially preferred results are obtained when it is thermally fused to the base fabric surface by the paste dot method. With the paste dot method, a heat-fusion bonding adhesive is introduced into a rotary screen having a plurality of fine holes and extruded onto a base fabric through the fine holes of the rotary screen to obtain a dot-like coating.

The diameter of fine holes in the rotary screen is usually about 200 $\mu$m. Utilizing the heat-fusion bonding adhesive in accordance with the present invention makes it possible to use a screen with a mesh size of about 50–200 $\mu$m. Furthermore, the dot density is usually 50–120 dots/cm$^2$ of base fabric, but utilizing the heat-fusion bonding adhesive in accordance with the present invention makes it possible to obtain a coating with a maximum of about 4000 dots/cm$^2$. The coating weight is usually 10–20 g/m$^2$, but utilizing the heat-fusion bonding adhesive in accordance with the present invention makes it possible to obtain a sufficient adhesive force even at a coating weight of no more than 5 g/m$^2$, the result depending on the type of base fabric.

If the base fabric is heated to a temperature of 80–150° C. upon coating the heat-fusion bonding adhesive on the base fabric, the heat-fusion bonding adhesive is dried, melted, and fused to the base fabric, producing the target adhesive fabric. The obtained adhesive fabric can be adhesively bonded, for example, as an adhesive interlining, with an iron or a hot press to a variety of different surface fabrics, providing for a very good finish feel when used for thin cloth, in particular, thin cloth for women.

BEST MODE FOR CARRYING OUT THE INVENTION

The present invention will be described below in greater details based on examples thereof and comparative examples. The present invention is, however, not limited to those examples.

EXAMPLE 1

Preparation of Aqueous Dispersion of Thermoplastic Resin

A total of 150 kg of 6/66/12 copolyamide (softening point 130° C.), 149.6 kg of water, and 0.4 kg of sodium hydroxide were charged and sealed in a pressure-resistant autoclave equipped with a jacket, having an inner diameter of 700 mm, a height of 1500 mm, and an inner capacity of 0.45 m$^3$, and provided with a turbine-type stirring impeller with a diameter of 350 mm. The stirrer was then activated and the temperature inside the autoclave was raised to 150° C. by circulating a heated oil in the jacket, while conducting stirring at a rate of 150 revolutions per minute. The stirring was further conducted for 30 minutes, while the internal temperature was maintained at 150° C. Then, the contents was cooled to 50° C. and an aqueous dispersion of 6/66/12 copolyamide resin with a resin concentration of 50 wt %. was obtained.

The weight-average particle size of the obtained aqueous dispersion of 6/66/12 copolyamide resin was measured with a particle size measurement apparatus of a laser diffraction type (manufactured by Shimadzu Corporation, model SALD 2000); the weight-average particle size was 1.2 μm.

EXAMPLE 2

Preparation of Aqueous Dispersion of Thermoplastic Resin

A total of 150 kg of terephthalic acid/isophthalic acid/1,4-butane diol copolyester (softening point 90° C.), 120 kg of water, and 30 kg of ethylene oxide-propylene oxide block copolymer as a surfactant were charged and sealed in a pressure-resistant autoclave equipped with a jacket, having an inner diameter of 700 mm, a height of 1500 mm, and an inner capacity of 0.45 $m^3$, and provided with a turbine-type stirring impeller with a diameter of 350 mm. The stirrer was then activated and the temperature inside the autoclave was raised to 150° C. by circulating a heated oil in the jacket, while conducting stirring at a rate of 150 revolutions per minute. The stirring was further conducted for 30 minutes, while the internal temperature was maintained at 150° C. Then, the contents was cooled to 50° C. and an aqueous dispersion of terephthalic acid/isophthalic acid/1,4-butane diol copolyester resin with a resin concentration of 50 wt % was obtained.

The weight-average particle size of the obtained aqueous dispersion of terephthalic acid/isophthalic acid/1,4-butane diol copolyester resin was measured with a particle size measurement apparatus of a laser diffraction type (manufactured by Shimadzu Corporation, model SALD 2000); the weight-average particle size was 2.5 μm.

EXAMPLE 3

Fabrication of Adhesive Fabric

A total of 0.2 weight parts of sodium polyacrylate was added to 100 weight parts of the aqueous dispersion of 6/66/12 copolyamide resin obtained in Example 1 and a paste-like heat-fusion bonding adhesive with a viscosity of 22,000 mPa·sec was obtained.

The obtained heat-fusion bonding adhesive was dot-like coated on the surface of a nylon nonwoven fabric with a weight of 25 $g/m^2$ by using a screen with a fine hole diameter of 80 μm. The dot density was 300 dots/$cm^2$ and the coating weight was 5 $g/m^2$. The adhesive fabric was then obtained by drying and fusing for 1 minute at a temperature of 150° C.

EXAMPLE 4

Fabrication of Adhesive Fabric

A total of 0.2 weight parts of sodium polyacrylate was added to 100 weight parts of the aqueous dispersion of terephthalic acid/isophthalic acid/1,4-butane diol copolyester resin obtained in Example 2 and a paste-like heat-fusion bonding adhesive with a viscosity of 20,000 mPa·sec was obtained.

The obtained heat-fusion bonding adhesive was dot-like coated on the surface of a polyester nonwoven fabric with a weight of 25 $g/m^2$ by using a screen with a fine hole diameter of 80 μm. The dot density was 300 dots/$cm^2$ and the coating weight was 5 $g/m^2$. The adhesive fabric was then obtained by drying and fusing for 1 minute at a temperature of 150° C.

EXAMPLE 5

Fabrication of Adhesive Fabric

A total of 0.2 weight parts of sodium polyacryalte was added to a liquid mixture of 50 weight parts of the aqueous dispersion of 6/66/12 copolyamide resin obtained in Example 1 and 50 weight parts of the aqueous dispersion of terephthalic, acid/isophthalic acid/1,4-butane diol copolyester resin obtained in Example 2 and a paste-like heat-fusion bonding adhesive with a viscosity of 20,000 mPa·sec was obtained.

The obtained heat-fusion bonding adhesive was dot-like coated on the surface of a nylon nonwoven fabric with a weight of 25 $g/m^2$ by using a screen with a fine hole diameter of 80 μm. The dot density was 300 dots/$cm^2$ and the coating weight was 5 $g/m^2$. The adhesive fabric was then obtained by drying and fusing for 1 minute at a temperature of 150° C.

EXAMPLE 6

Fabrication of Adhesive Fabric

A total of 1 weight part of polyethylene oxide (trade name PEO-18, manufactured by Sumitomo Seika Chemicals Co., Ltd.) was added to a liquid mixture of 90 weight parts of the aqueous dispersion of 6/66/12 copolyamide resin obtained in Example 1 and 10 weight parts of ethylene-vinyl acetate copolymer emulsion (trade name Sepolsion V, manufactured by Sumitomo Seika Chemicals Co., Ltd.) and a paste-like heat-fusion bonding adhesive with a viscosity of 23,000 mPa·sec was obtained.

The obtained heat-fusion bonding adhesive was dot-like coated on the surface of a nylon nonwoven fabric with a weight of 25 $g/m^2$ by using a screen with a fine hole diameter of 80 μm. The dot density was 300 dots/$cm^2$ and the coating weight was 5 $g/m^2$. The adhesive fabric was then obtained by drying and fusing for 1 minute at a temperature of 150° C.

COMPARATIVE EXAMPLE 1

A 6/66/12 copolyamide resin (softening temperature 130° C.) was frozen, ground and then classified through a standard sieve with a mesh size of 80 μm to obtain a 6/66/12 copolyamide resin powder with a weight-average particle size of 45 μm. A total of 64.8 weight parts of water and 0.2 weight parts of sodium polyacryalte were added to 35 weight parts of the obtained 6/66/12 copolyamide resin powder and the components were stirred to obtain a paste-like heat-fusion bonding adhesive with a viscosity of 23,000 mPa·sec.

The obtained heat-fusion bonding adhesive was dot-like coated on the surface of a nylon nonwoven fabric with a weight of 25 $g/m^2$ at a dot density of 300 dots/$cm^2$ and a coating weight of 5 $g/m^2$ by using a screen with a fine hole diameter of 80 μm. However, the screen was partially clogged and dot-like coating was impossible.

COMPARATIVE EXAMPLE 2

A 6/66/12 copolyamide resin (softening temperature 130° C.) was frozen, ground and then classified through a standard sieve with a mesh size of 80 μm to obtain a 6/66/12 copolyamide resin powder with a weight-average particle size of 45 μm. A total of 64.8 weight parts of water and 0.2 weight parts of sodium polyacryalte were added to 35 weight parts of the obtained 6/66/12 copolyamide resin powder and the components were stirred to obtain a paste-like heat-fusion bonding adhesive with a viscosity of 23,000 mPa·sec.

The obtained heat-fusion bonding adhesive was dot-like coated on the surface of a nylon nonwoven fabric with a weight of 25 g/m² at a dot density of 150 dots/cm² and a coating weight of 10 g/m² by using a screen with a fine hole diameter of 200 μm. The adhesive fabric was then obtained by drying and fusing for 2 minutes at a temperature of 150° C.

COMPARATIVE EXAMPLE 3

A terephthalic acid/isophthalic acid/1,4-butane diol copolyester resin (softening temperature 90° C.) was frozen, ground and then classified through a standard sieve with a mesh size of 80 μm to obtain a terephthalic acid/isophthalic acid/1,4-butane diol copolyester resin powder with a weight-average particle size of 42 μm. A total of 64.8 weight parts of water and 0.2 weight parts of sodium polyacrylate were added to 35 weight parts of the obtained terephthalic acid/isophthalic acid/1,4-butane diol copolyester resin powder and the components were stirred to obtain a paste-like heat-fusion bonding adhesive with a viscosity of 22,000 mPa·sec.

The obtained heat-fusion bonding adhesive was dot-like coated on the surface of a polyester nonwoven fabric with a weight of 25 g/m² at a dot density of 300 dots/cm² and a coating weight of 5 g/m² by using a screen with a fine hole diameter of 80 μm. However, the screen was partially clogged and dot-like coating was impossible.

COMPARATIVE EXAMPLE 4

A terephthalic acid/isophthalic acid/1,4-butane dial copolyester resin (softening temperature 90° C.) was frozen, ground and then classified through a standard sieve with a mesh size of 80 μm to obtain a terephthalic acid/isophthalic acid/1,4-butane diol copolyester resin powder with a weight-average particle size of 42 μm. A total of 64.8 weight parts of water and 0.2 weight parts of sodium polyacrylate were added to 35 weight parts of the obtained terephthalic acid/isophthalic acid/1,4-butane diol copolyester resin powder and the components were stirred to obtain a paste-like heat-fusion bonding adhesive with a viscosity of 23,000 mPa·sec.

The obtained heat-fusion bonding adhesive was dot-like coated on the surface of a polyester nonwoven fabric with a weight of 25 g/m² at a dot density of 150 dots/cm² and a coating weight of 10 g/m² by using a screen with a fine hole diameter of 200 μm. The adhesive fabric was then obtained by drying and fusing for 2 minutes at a temperature of 150° C.

Evaluation

Feel of the adhesive fabrics obtained in Examples 3–6 and Comparative Examples 1–4 was evaluated by the following method. The results are shown in Table 1.

FEEL EVALUATION METHOD

Evaluation was conducted by a functional test based on the following criteria:

⊚: softness of cloth is fully maintained.
Δ: feels slightly stiff.
X: stiff.

TABLE 1

| No. | Feel Evaluation |
| --- | --- |
| Example 3 | ⊚ |
| Example 4 | ⊚ |
| Example 5 | ⊚ |
| Example 6 | ⊚ |
| Comparative Example 1 | — |
| Comparative Example 2 | Δ~x |
| Comparative Example 3 | — |
| Comparative Example 4 | Δ~x |

As described above, in Examples 3–6 of the present invention, the thermoplastic resin in the aqueous medium (heat-fusion bonding adhesive) had a weight-average particle size of 0.1–20 μm and was dispersed uniformly. Therefore, when coating is conducted by the paste dot method, screen clogging hardly occurs and the adhesive can be coated on the surface of a basic fabric in the form of small dots and with a high density. As a result, when the obtained adhesive fabric is used as an adhesive interlining of thin cloths, in particular, thin cloths for women, excellent characteristics can be provided. Thus, aesthetic shaping ability which provides feel and draping ability necessary to obtain beautiful silhouette and aesthetic functions required for clothing is not degraded. By contrast, in comparative Examples 1–4, the heat-fusion bonding adhesive could not be coated on a basic fabric, or even when it could be coated, the feel was degraded.

What is claimed is:

1. A method for manufacturing a heat-fusion bonding adhesive comprising the steps of heating a thermoplastic resin to a temperature of no less than a softening point of the resin, and dispersing the resin in the softened state in an aqueous medium to obtain an aqueous dispersion of the thermoplastic resin.

2. The manufacturing method according to claim 1, wherein the dispersing of said thermoplastic resin in said aqueous medium is conducted by applying a shear force to said aqueous medium by stirring.

3. The manufacturing method according to claim 2, wherein the stirring of said aqueous medium is conducted till said thermoplastic resin is divided into particles with a weight-average particle diameter of 0.1–20 μm.

4. The manufacturing method according to claim 1, wherein at least one of a surfactant, a dispersing agent, and a basic substance is added to said aqueous medium.

5. The manufacturing method according to claim 1, wherein said thermoplastic resin is softened by being heated to a temperature of 50–300° C.

6. The manufacturing method according to claim 1, wherein the ratio of said aqueous medium is 30–1500 weight parts per 100 weight parts of said thermoplastic resin.

7. The manufacturing method according to claim 1, wherein the viscosity of said aqueous medium is adjusted to 5000–50,000 mPa·sec by the addition of a viscosity-adjusting agent.

8. The manufacturing method according to claim 1, wherein said thermoplastic resin is selected from the group consisting of copolyamide resins, copolyester resins, and mixtures thereof.

9. The manufacturing method according to claim 8, wherein said copolyamide resin has structural units of at least two types selected from the group consisting of —[NH $(CH_2)_5CO]$—, —$[NH(CH_2)_6NHCO(CH_2)_4CO]$—, —$[NH(CH_2)_6NHCO(CH_2)_4CO]$—, —$[NH(CH_2)_{10}CO]$—, and —$[NH(CH_2)_{11}CO]$—.

10. The manufacturing method according to claim 8, wherein said copolyester resin is a resin obtained by polycondensation of an acid component comprising terephthalic acid and isophthalic acid and a diol component selected from the group consisting of ethylene glycol, diethylene glycol, polyethylene glycol, 1,4-butane diol, and 1,6-hexane diol.

11. A heat-fusion bonding adhesive prepared by the manufacturing method defined in claim 1.

12. An adhesive fabric obtained by coating, on a surface of a base fabric, the heat-fusion bonding adhesive prepared by the manufacturing method defined in claim 1, and then thermally fusing the adhesive.

* * * * *